United States Patent
Miller, IV et al.

(10) Patent No.: US 11,823,316 B2
(45) Date of Patent: *Nov. 21, 2023

(54) PHOTOREAL CHARACTER CONFIGURATIONS FOR SPATIAL COMPUTING

(71) Applicant: Magic Leap, Inc., Plantation, FL (US)

(72) Inventors: Thomas Marshall Miller, IV, Los Angeles, CA (US); Nafees Bin Zafar, Plantation, FL (US); Sean Michael Comer, Encino, CA (US); James Jonathan Bancroft, Culver City, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,474

(22) Filed: Nov. 21, 2022

(65) Prior Publication Data
US 2023/0087227 A1 Mar. 23, 2023

Related U.S. Application Data

(63) Continuation of application No. 17/477,046, filed on Sep. 16, 2021, now Pat. No. 11,544,888, which is a
(Continued)

(51) Int. Cl.
*G06T 19/00* (2011.01)
*G06T 13/40* (2011.01)

(52) U.S. Cl.
CPC ............ *G06T 13/40* (2013.01); *G06T 19/006* (2013.01)

(58) Field of Classification Search
None
See application file for complete search history.

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf , retrieved on Oct. 26, 2020.

(Continued)

*Primary Examiner* — Nicholas R Wilson
(74) *Attorney, Agent, or Firm* — MORRISON & FOERSTER LLP

(57) ABSTRACT

Systems and methods for displaying a virtual character in a mixed reality environment are disclosed. In some embodiments, a view of the virtual character is based on an animation rig comprising primary joints and helper joints. The animation rig may be in a pose defined by spatial relationships between the primary joints and helper joints. The virtual character may be moving in the mixed reality environment. In some instances, the virtual character may be moving based on a comparison of interestingness values associated with elements in the mixed reality environment. The spatial relationship transformation associated with the movement may be indicated by movement information. In some embodiments, the movement information is received from a neural network.

20 Claims, 14 Drawing Sheets

Related U.S. Application Data continuation of application No. 16/894,141, filed on Jun. 5, 2020, now Pat. No. 11,151,766.

(60) Provisional application No. 62/858,251, filed on Jun. 6, 2019.

(56) References Cited

U.S. PATENT DOCUMENTS

| | | |
|---|---|---|
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,488,294 B2 | 2/2009 | Torch |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,733,927 B1 | 5/2014 | Lewis |
| 8,733,928 B1 | 5/2014 | Lewis |
| 8,929,589 B2 | 1/2015 | Publicover et al. |
| 9,010,929 B2 | 4/2015 | Lewis |
| 9,123,175 B1 | 9/2015 | Goldenthal |
| 9,274,338 B2 | 3/2016 | Robbins et al. |
| 9,292,973 B2 | 3/2016 | Bar-zeev et al. |
| 9,658,473 B2 | 5/2017 | Lewis |
| 9,720,505 B2 | 8/2017 | Gribetz et al. |
| 10,013,053 B2 | 7/2018 | Cederlund et al. |
| 10,025,379 B2 | 7/2018 | Drake et al. |
| 10,185,147 B2 | 1/2019 | Lewis |
| 11,151,766 B2 | 10/2021 | Miller, IV et al. |
| 11,544,888 B2 | 1/2023 | Miller, IV et al. |
| 2003/0030597 A1 | 2/2003 | Geist |
| 2004/0263531 A1 | 12/2004 | Maille |
| 2006/0023158 A1 | 2/2006 | Howell et al. |
| 2011/0211056 A1 | 9/2011 | Publicover et al. |
| 2011/0213664 A1 | 9/2011 | Osterhout |
| 2012/0021806 A1 | 1/2012 | Maltz |
| 2014/0195918 A1 | 7/2014 | Friedlander |
| 2014/0368535 A1 | 12/2014 | Salter |
| 2015/0168731 A1 | 6/2015 | Robbins |
| 2015/0187113 A1 | 7/2015 | Rubin |
| 2017/0091977 A1 | 3/2017 | West |
| 2022/0076475 A1 | 3/2022 | Miller, IV et al. |

FOREIGN PATENT DOCUMENTS

| | | |
|---|---|---|
| CA | 2388766 A1 | 12/2003 |
| WO | 2020247863 A1 | 12/2020 |

OTHER PUBLICATIONS

Bimber, Oliver et al. (2005). "Spatial Augmented Reality: Merging Real and Virtual Worlds," A. K. Peters, Ltd., Wellesley, MA.
European Search Report dated Jul. 26, 2022, for EP Application No. 20817824.4, fourteen pages.
European Search Report dated Oct. 26, 2022, for EP Application No. 20817824.4, twelve pages.
International Preliminary Report on Patentability and Written Opinion dated Dec. 16, 2021, for PCT Application No. PCT/US2020/036485, filed Jun. 5, 2020, eleven pages.
International Search Report and Written Opinion dated Sep. 4, 2020, for PCT Application No. PCT/US2020/036485, filed Jun. 5, 2020, thirteen pates.
Jacob, R. "Eye Tracking in Advanced Interface Design", Virtual Environments and Advanced Interface Design, Oxford University Press, Inc. (Jun. 1995).
Jacobson, Alec. (2014). "Part II: Automatic Skinning via Constrained Energy Optimization," SIGGRAPH Course 2014—Skinning: Real-time Shape Deformation, Columbia University and ETH Zurich, 28 pages.
Jang et al. "A Variational U-Net for Motion Retargeting," SA '18 Posters, Dec. 4-7, 2018, Tokyo, Japan. Retrieved on Aug. 18, 2020. Retrieved from URL:https://dl.acm.org/doi/pdf/10.1145/3283289.3283316 entire document.
Jeremiah, "Forward vs Deferred vs Forward+ Rendering with DirectX 11" https://www.3dgep.com/forward-plus/#Forward, 2015. Year: 2015).
Ladislav, Kavan. (2014). "Part I: Direct Skinning Methods and Deformation Primitives," SIGGRAPH Course 2014—Skinning: Real-time Shape Deformation, University of Pennsylvania, 11 pages.
Le, Binh H., et al. (2014). "Mesh Animation Decomposition and Compression," SIGGRAPH Course 2014—Skinning: Real-time Shape Deformation, University of Houston, 35 pages.
Lewis, J.P. (2014). "Part III: Example-based Shape Deformation," v1.01, SIGGRAPH Course 2014—Skinning: Real-time Shape Deformation, Victoria University and Weta Digital, 20 pages.
Mahendran, Siddharth, et al. (Aug. 18, 2017). "3D Pose Regression using Convolutional Neural Networks," Center for Imaging Science, Johns Hopkins University, 9 pages.
Mukai et al., "Efficient Dynamic Skinning with Low Rank Helper Bone Controllers", ACM, 2016.
Mukai, "Sampling-based Rig Conversion into Non-rigid Helper Bones", Proc. ACM Computer Graph. Interact. Tech., vol. 1, No. 1, Article 13. Publication date: May 2018. Retrieved onAug. 18, 2020. Retrieved from URL: https://dl.acm.org/doi/pdf/10.1145/3203190 entire document.
Non-Final Office Action dated Jul. 7, 2022, for U.S. Appl. No. 17/477,046, filed Sep. 16, 2021, 14 pages.
Non-Final Office Action dated Mar. 4, 2021, for U.S. Appl. No. 16/894,141, filed Jun. 5, 2020, 36 pages.
Notice of Allowance dated Jun. 21, 2021, for U.S. Appl. No. 16/894,141, filed Jun. 5, 2020, 6 pages.
Notice of Allowance dated Oct. 26, 2022, for U.S. Appl. No. 17/477,046, filed Sep. 16, 2021, seven pages.
Parks, Jason: "Helper Joints: Advanced Deformations on RunTime Characters", Game Developers Conference 2005, Tutorial, Mar. 11, 2005(Mar. 11, 2005), slides 1-115;https://www.cmpevents.com/sessions/GD/Parks_Jason_HelperJoints.ppt with corresponding audio under https://www.gdcvault.com/play/1019992/Helper-Joints-Advanced-Deformations-on.
Pavllo, Dario, et al. (Oct. 26, 2019). "Modeling Human Motion with Quaternion-based Neural Networks," arXiv:1901.07677v2 [cs.CV], 18 pages.
Rolland, J. et al., "High-resolution inset head-mounted display", Optical Society of America, vol. 37, No. 19, Applied Optics, (Jul. 1, 1998).
Sharpe, "Rigging Realistic Skin Deformation with Muscle Systems", Thesis Presented to the Graduate School of Clemson University, May 30, 2019. Retrieved on Aug. 17, 2020. Retrieved from URL:https://tigerprints.clemson.edu/cgi/viewcontent.cgi?article4O58&context=slltheses, entire document.
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).

PHOTOREAL CHARACTER CONFIGURATIONS FOR SPATIAL COMPUTING

CROSS-REFERENCE TO RELATED APPLICATIONS

This application claims benefit of U.S. Non-Provisional application Ser. No. 17/477,046, filed Sep. 16, 2021, which is a Continuation of U.S. Non-Provisional application Ser. No. 16/894,141, filed Jun. 5, 2020, now U.S. Pat. No. 11,151,766, issued Oct. 19, 2021, which claims benefit of U.S. Provisional Patent Application No. 62/858,251, filed Jun. 6, 2019, the contents of which are incorporated herein by reference in their entirety.

FIELD OF INVENTION

This disclosure is generally related to systems, methods, and configurations pertaining to portrayal and interaction associated with objects in a mixed reality environment.

BACKGROUND

There have been improvements in virtual character technology on screen, in film, and in gaming. Next steps in the development of virtual characters may be improvements virtual character actions and interactions to give them attributes that are more believable to a viewer and giving the viewer and more immersive experience. Virtual characters who are more aware of and can interact more directly with users in a virtual, augmented reality, or mixed reality environment may provide the user a more compelling experience.

However, presenting the virtual characters in a more life-like manner may require more processing. Optimizing the presentation of more like-life virtual characters may be especially important for a mixed reality system, which may have hardware limitations such as finite battery capacity and finite amount of processing resource to maintain the system's portability. Optimization of virtual character presentation in a mixed reality environment includes meeting a high bar of creating a convincing virtual character—rendering, animation, deformations, clothing, hair, and behavior may need to meet a certain intangible quality level for the character to be believable while also fitting within the performance envelope of the mixed reality system hardware.

BRIEF SUMMARY

Systems and methods for displaying a virtual character in a mixed reality environment are disclosed. In some embodiments, a view of the virtual character is based on an animation rig comprising primary joints and helper joints. The animation rig may be in a pose defined by spatial relationships between the primary joints and helper joints. The locations of helper joints may be determined by a helper joint placement criterion. The virtual character may be moving in the mixed reality environment. In some instances, the virtual character may be moving based on a comparison of interestingness values associated with elements in the mixed reality environment. The spatial relationship transformation associated with the movement may be indicated by movement information. In some embodiments, the movement information is received from a neural network. In some embodiments, the movement information is determined using a regression analysis.

DETAILED DESCRIPTION

Figure 1A:
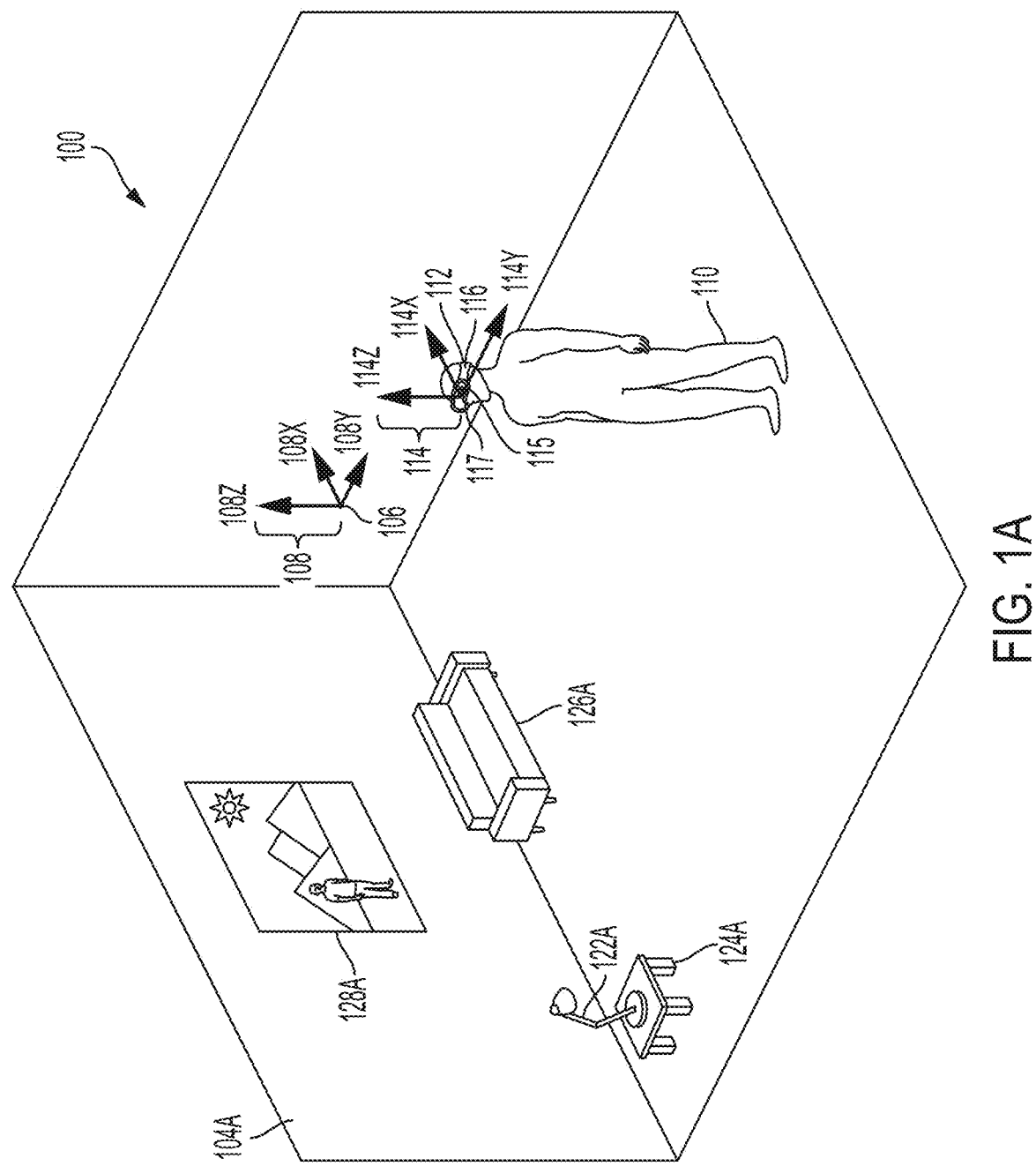
FIGS. 1A-1C illustrate exemplary environments, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a mixed reality system exists in a real environment that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

In some examples, virtual objects hay have characteristics that resemble corresponding real objects. For instance, a virtual character may be presented in a virtual or mixed reality environment as a life-like figure to provide a user an immersive mixed reality experience. With virtual characters having life-like characteristics, the user may feel like he or she is interacting with a real person. In such instances, it is desirable for actions such as muscle movements and gaze of the virtual character to appear natural. For example, movements of the virtual character should be similar to its corresponding real object (e.g., a virtual human should walk or move its arm like a real human). As another example, the gestures and positioning of the virtual human should appear natural, and the virtual human can initial interactions with the user (e.g., the virtual human can lead a collaborative experience with the user). Presentation of virtual characters having life-like characteristics is described in more detail herein.

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
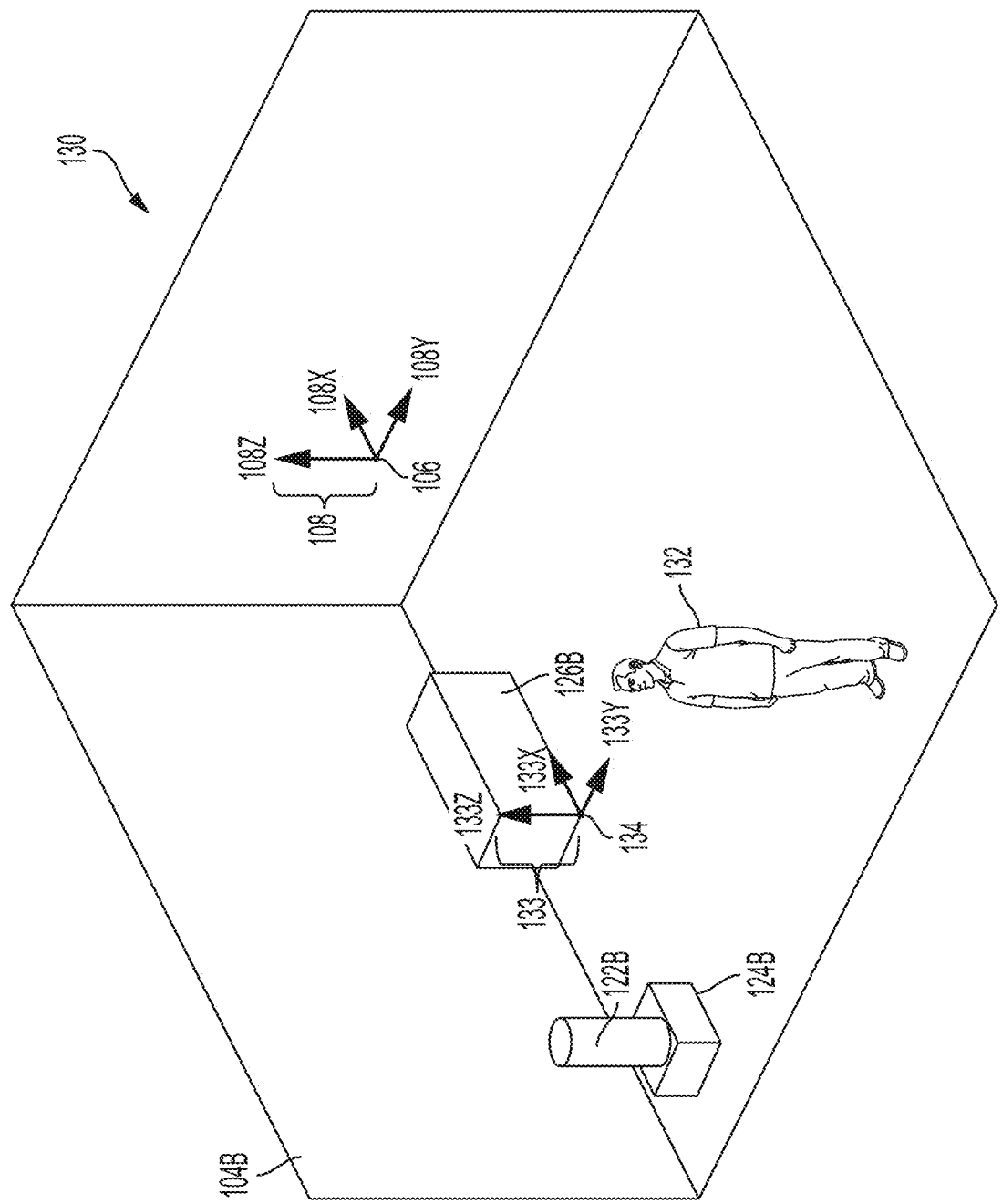

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual character 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
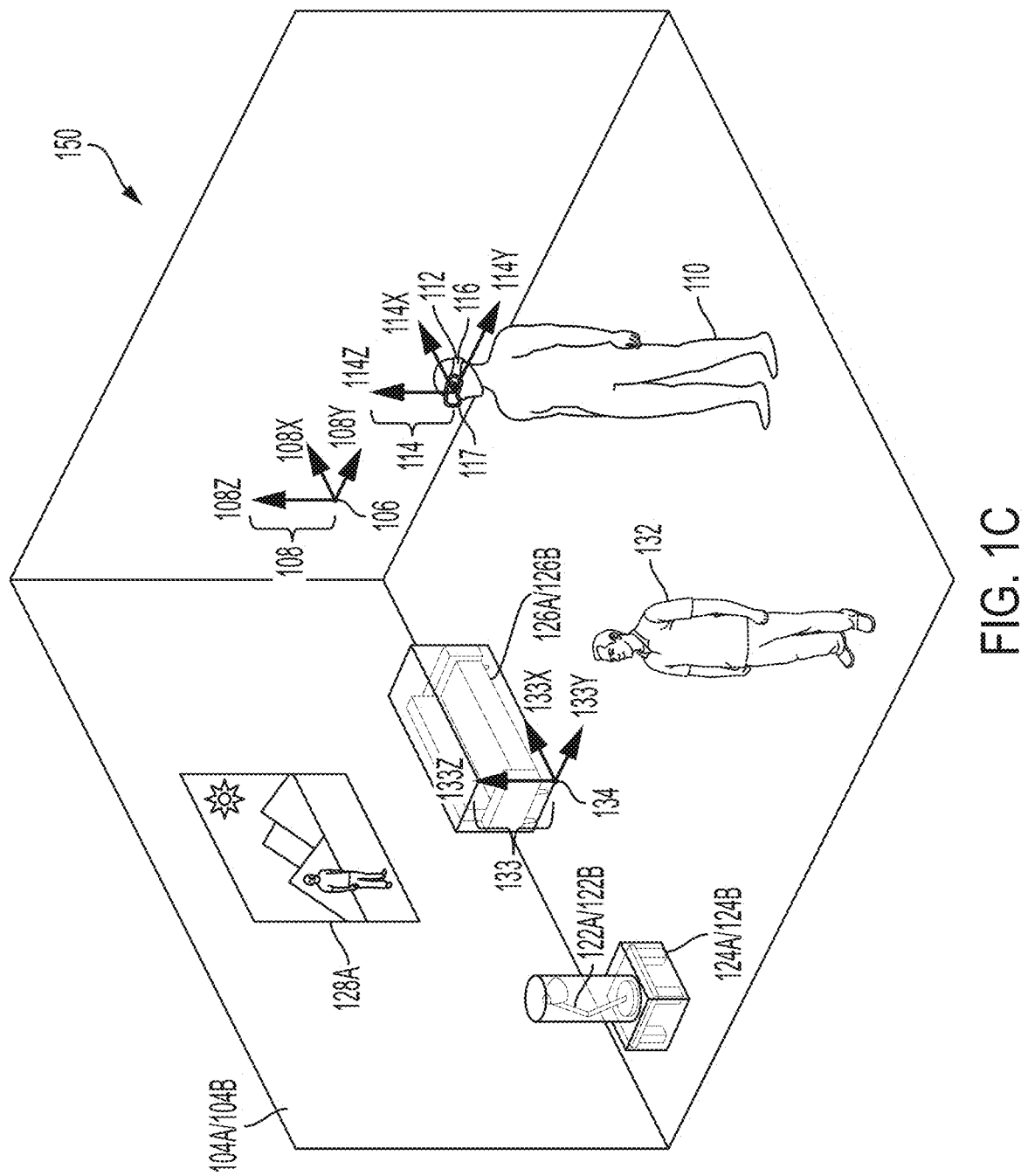

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual character 132 could be associated with one or more audio signals, such as a footstep sound effect that is generated as the character walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including neural networks (e.g., in the cloud) for data processing and training data associated with presentation of elements (e.g., virtual character 132) in the MRE 150 and other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

In some embodiments, an animation rig is used to present the virtual character 132 in the MRE 150. Although the animation rig is described with respect to virtual character 132, it is understood that the animation rig may be associated with other characters (e.g., a human character, an animal character, an abstract character) in the MRE 150. Movement of the animation rig is described in more detail herein.

Figure 2A:
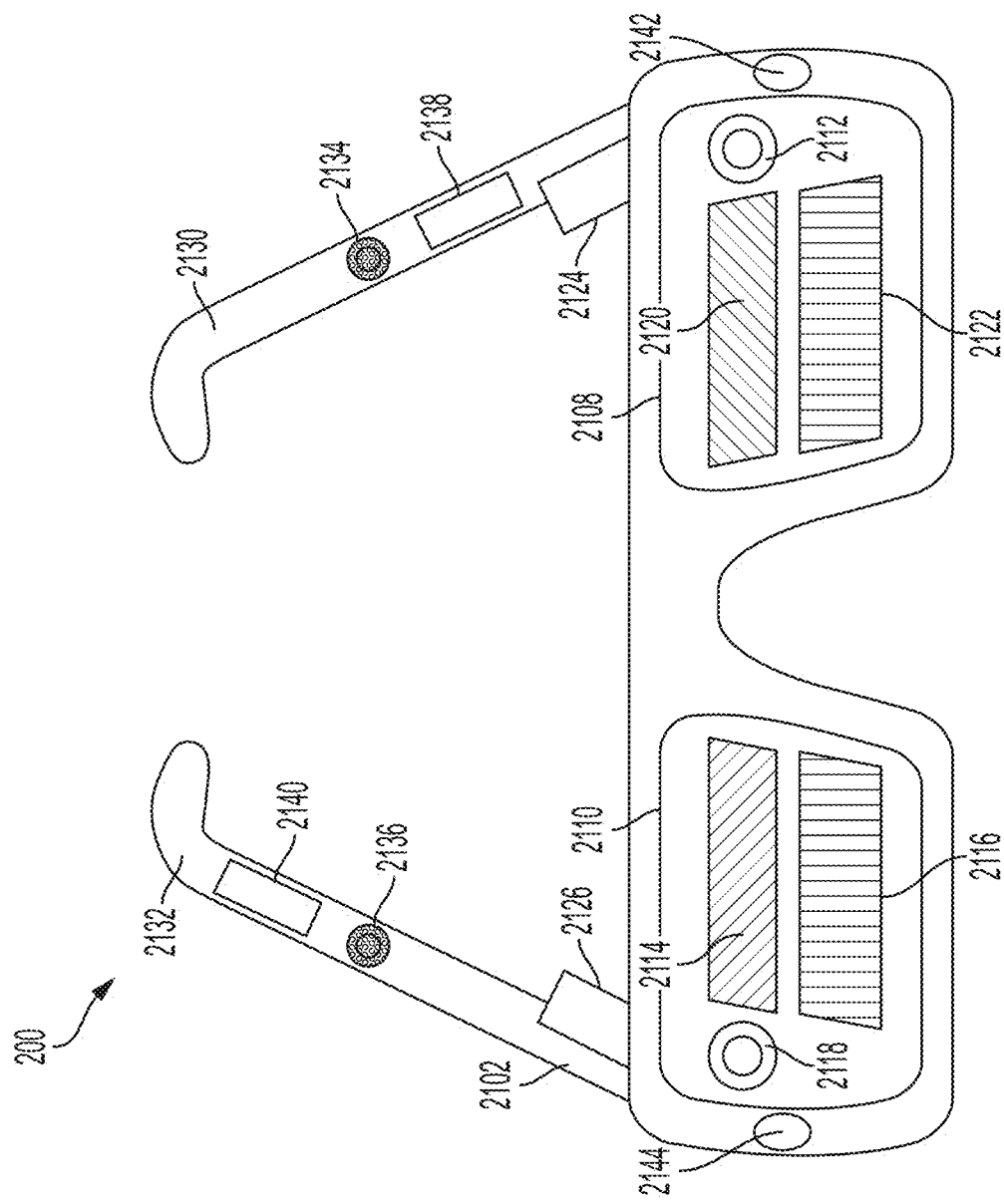
FIGS. 2A-2D illustrate components of exemplary mixed reality systems, according to embodiments of the disclosure.
Figure 2B:
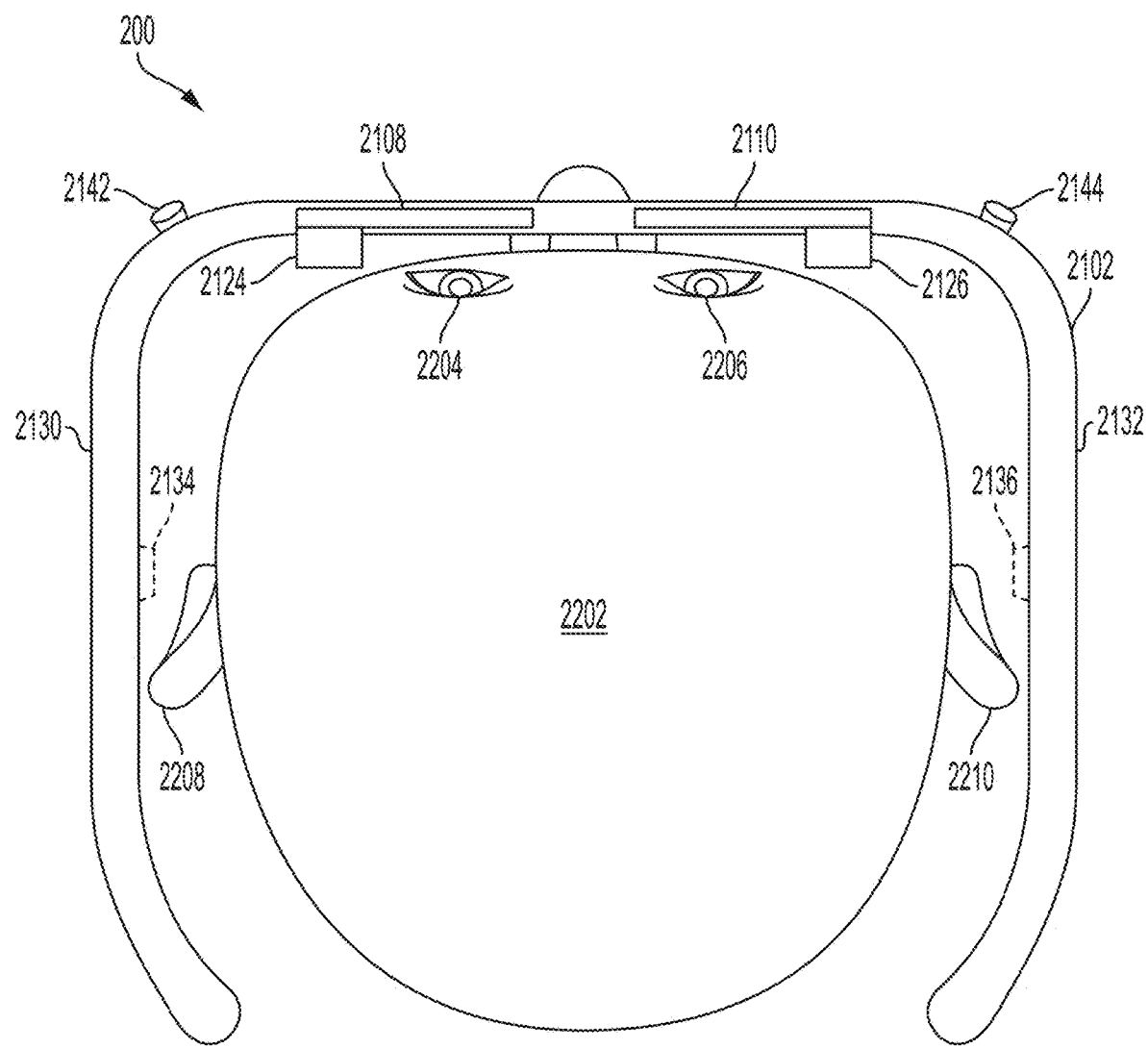
Figure 2C:
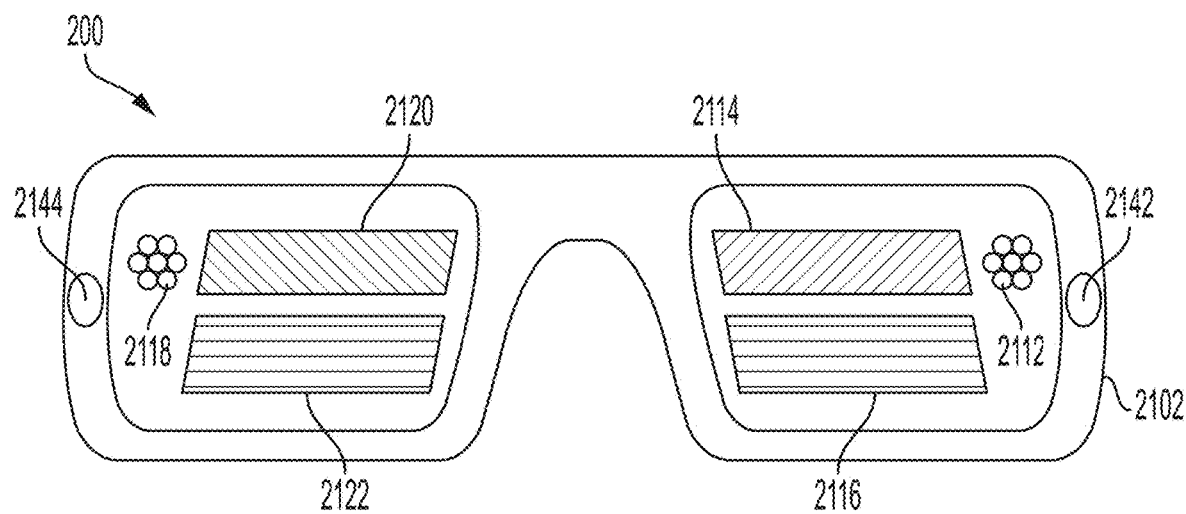
Figure 2D:
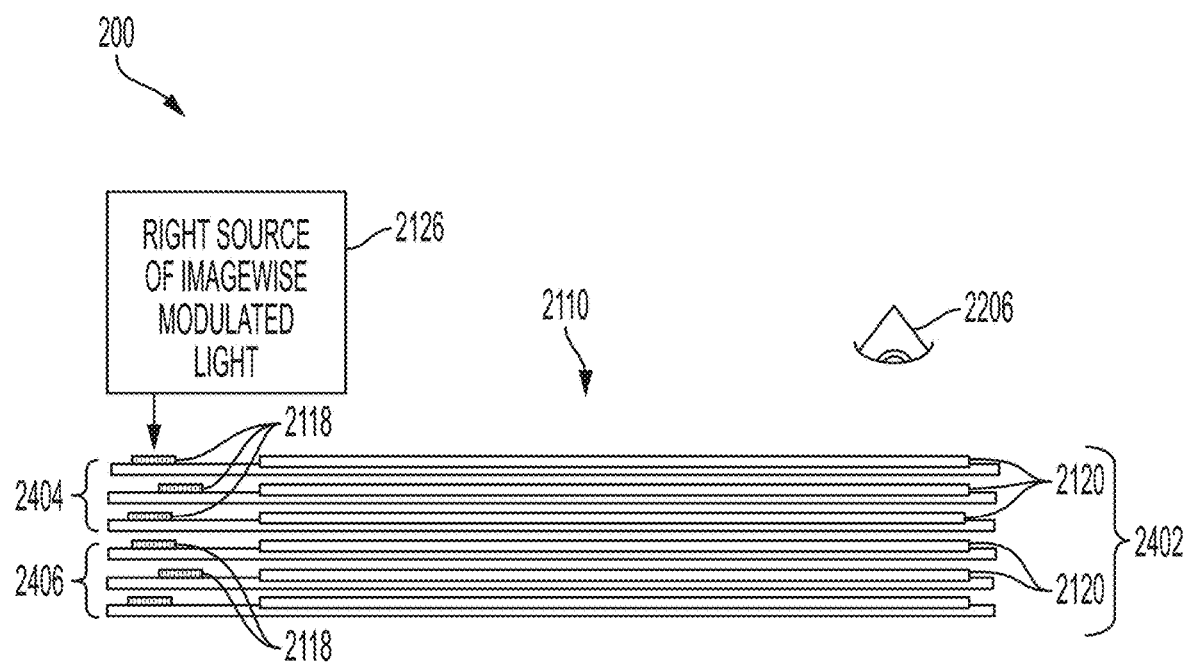

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (µLED) or micro Organic Light Emitting Diode (µLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue. and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 may be mirrored relative to the structure of the right eyepiece 2110.

Figure 3A:
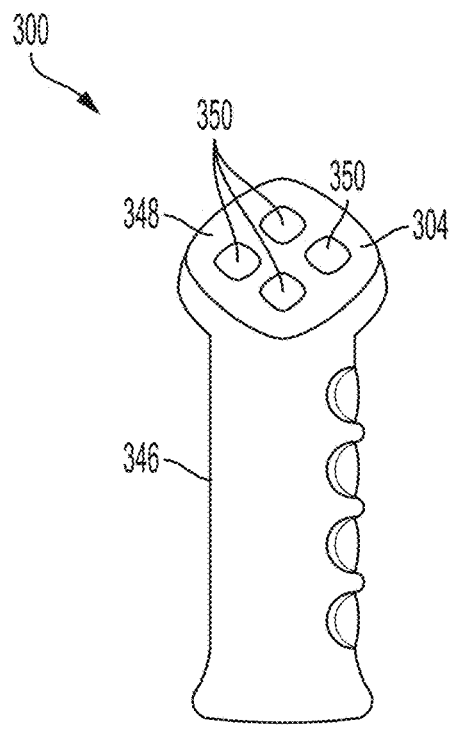
FIG. 3A illustrates an exemplary mixed reality handheld controller, according to embodiments of the disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
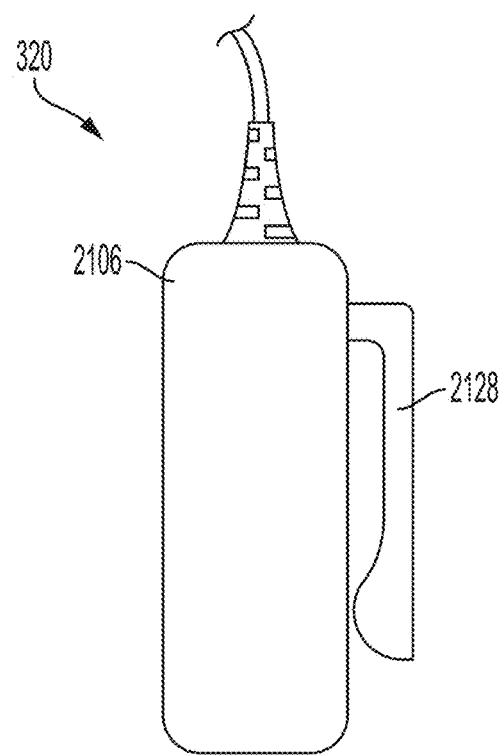
FIG. 3B illustrates an exemplary auxiliary unit, according to embodiments of the disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
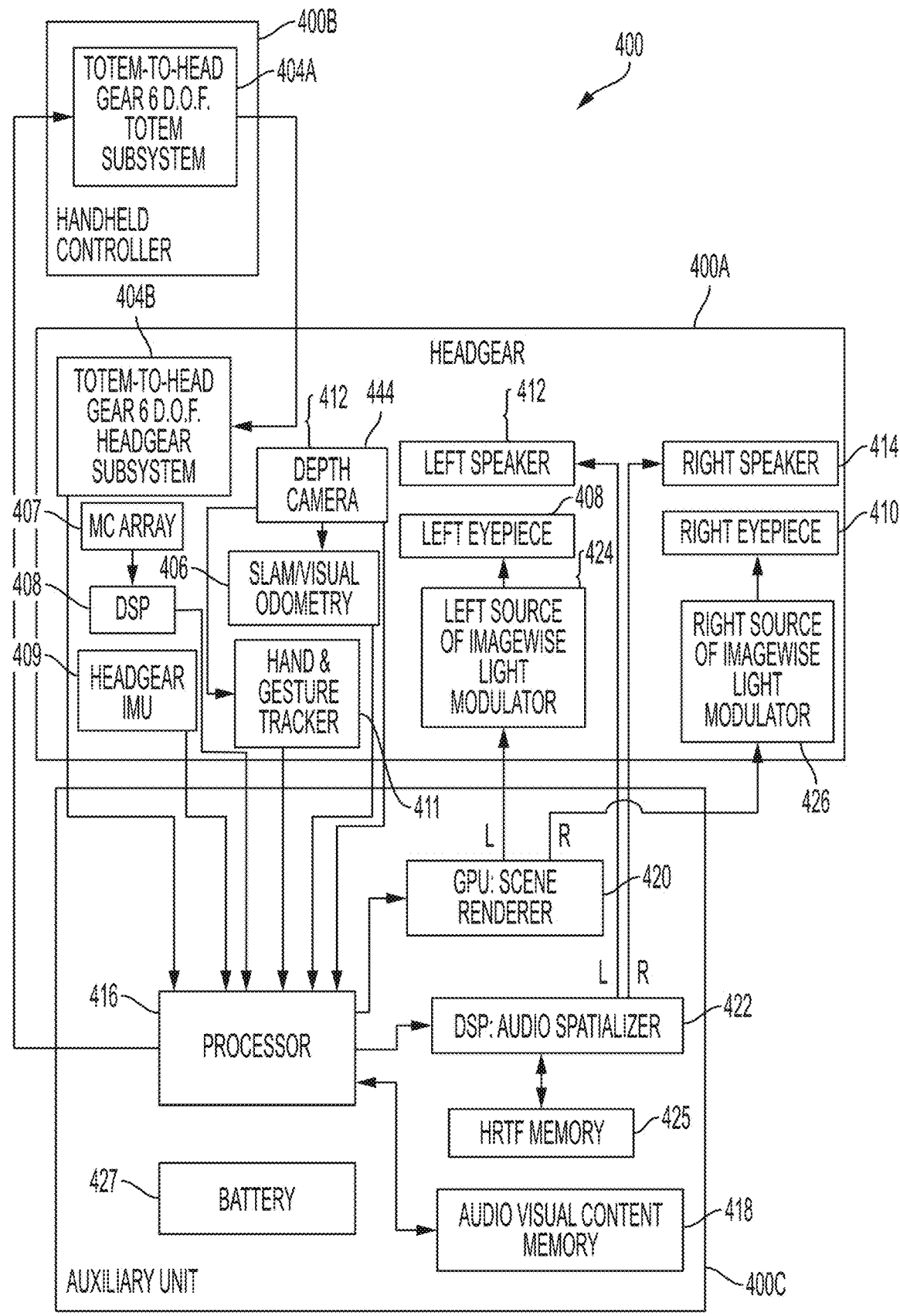
FIG. 4 illustrates an exemplary functional block diagram of an exemplary mixed reality system, according to embodiments of the disclosure.

FIG. 4 shows an exemplary functional block diagram that may correspond to an exemplary mixed reality system, such as mixed reality system 200 described herein (which may correspond to mixed reality system 112 with respect to FIG. 1). Elements of wearable system 400 may be used to implement the methods, operations, and features described in this disclosure. As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A (e.g., of MR system 112) relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described herein with respect to FIGS. 2A-2D. In some examples, the GPU 420 may be used to render virtual elements in the MRE presented on the display of the wearable system 400. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some embodiments, the graphics in the mixed reality environment (e.g., the virtual character) may be rendered using "Forward+," which is a version of a desktop renderer without a G-buffer. As an exemplary advantage, Forward+ include a wider choice of lighting and surface shading models, compute-shader optimized skinning and post-morph-target normal recalculations, and more post-processing options, compared to a mobile renderer. Using such a renderer and with access to engine source code, custom changes to character-related engine features and shading models may be made. Additionally, Forward+ may free the mixed reality system from bottleneck due to the lack of a G-buffer and allowing otherwise unused cycles on the GPU (e.g., GPU 420) to be utilized. In contrast, rendering in full deferred mode and maintaining graphics at 60 frames per second in stereo may leave the mixed reality system little room for other runtime computation.

In some embodiments, the hardware and software stack of the mixed reality system supports a graphics application programming interface such as Vulkan. As an exemplary advantage, Vulkan may free up room on the CPU and allowed the system to shuffle allocations of CPU and GPU resources to get achieve better performance (e.g., over frames per second stereo).

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example wearable systems 400, various other suitable arrangements of these components will become apparent to those skilled in the art. For example, the headgear device 400A illustrated in may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Figure 5:
FIG. 5 illustrates an exemplary character in a mixed reality environment, according to embodiments of the disclosure.

FIG. 5 illustrates an exemplary character in a mixed reality environment, according to embodiments of the disclosure. The virtual character 500 may be an autonomous and photoreal human character known or referred to as "Mica." The character 500 may be configured to be presented on a display of a mixed reality system (e.g., mixed reality system 112, mixed reality system 200, wearable system 400). For example, the character 500 may be virtual character 132 in the MRE 150. In some embodiments, an animation rig is used to present the virtual character 132 in the MRE 150. Although the face and neck of the virtual character 500 is shown in FIG. 5, it is understood that the descriptions of the virtual character 500 may be applicable to the entire body of the character.

The character 500 may be based on a composite of different individual humans. The character 500 may include artistic designs unique to the character. The base 3D models and textures of the character may be acquired by scanning actors in a high-resolution photogrammetry system. The scanned models may then be artistically sculpted into the character. The character 500 may be derived from a level-of-detail (LOD) chain anchored by a high-quality, "VFX style" asset that can be rendered offline in a path tracer, and the realism of the character may be validated (e.g., by the designer). For quality control and reference purposes, it may be important to have a target look for the character at this level. For instance, when making changes to the character 500, the top-most of the LOD chain is updated, the changes migrate down, rather than changing directly in a lower LOD. The created character may be imported into a game engine such as Unreal Engine 4 to create animation for the character in the mixed reality environment (e.g., MRE 150). As an exemplary advantage, the created character may be used across different platforms or later versions of a platform without substantial updates to the character between the different platforms or the different versions.

In some embodiments, facial geometry and expressiveness of character 500 are emphasized over other features of the character to optimize computing efficiency (e.g., to reduce computing resources associated with these other features). For instance, the user may be standing face-to-face with the character 500. The user may pick up on the shape of the character's smile and the glint in the eyes, so emphasis on these features may allow a more immersive user experience while maintaining computing efficiency. In some embodiments, less emphasis may put placed on global illumination or individual strands of hair; computations of these character features may be intensive and consume device power with less benefits for user experience. To reduce emphasis while maximizing quality, for example, the virtual character's dense hair groom may be converted to polygon strips to improve performance. Although the hair of the virtual character may not be dynamic, the polygon hair strips may react to facial expressions and head motion using synchronized blendshapes. A blendshape may allow a single mesh of an animation rig to deform to achieve numerous pre-defined shapes and any number of combinations of in-between these shapes. To give the hair a more life-like appearance, a custom hair shader may be used in place of a hair shader provided by a game engine, such as Unreal Engine 4.

In some embodiments, an animation rig is used to present the virtual character 132 in the MRE 150. For example, the animation rig may be created using a graphics application such as Maya. It is understood that other graphics application may be used to build the animation rig. In the graphics application, characteristics of the animation rig such as skin clusters, custom blendshape node, specific constraints, expressions, custom mesh-to-mesh collision, clothing simulation, hair simulation, Delta Mush deformation, and control systems such as Facial Action Coding System (FACS) combo shapes, blendshape weights, and joint transforms are defined.

In some embodiments, FACS based blendshapes are used in animating the character's facial features, which includes over 120 FACS shapes and an additional 800 shapes combined from the 120 FACS shapes. After the animation rig is created, a logic node may include a custom rule based system to manage combinatorial logic for these shapes, and to capture procedural relationships, such as set driven keys. The logic node also provide an expression language and capture connections and dependencies between features of the animation rig (e.g., mathematical expressions, pose coordinates). The logic node may also generate a C++ engine code based on the animation rig, which is compiled for realtime execution (e.g., when a character is presented in a mixed reality environment).

The deformation of the eyes, tongue, teeth, jaw, head, and neck may be driven by blendshapes and linear blend skinning. This skinning of the body and clothing may be computed by manually creating example poses and a set of joints, and solving for the joint positions (e.g., spatial relationships) and skin weights with convex quadratic programming.

In some embodiments, body deformations are created using a layered scheme with a base skeleton (e.g., primary joints) driving a higher level system of joints (e.g., helper joints). These joints may drive blendshape and skinning based deformations. Clothing simulations may be run with a range of motion animation sequence, and presentation of the resulting deformations may be computed.

The methods and features described herein allow characteristics of the animation rig created in the graphics application to be efficiently presented in a mixed reality system, such as mixed reality system 112, mixed reality system 200, or wearable system 400, which may have hardware limitations such as power consumption requirements and limited processing resources (e.g., a mobile CPU may be running the mixed reality system, the system may have a 1 ms/frame budget), for example, to maintain the portability of the system. Biomechanics behaviors and deformation of the character 500 may be more important to create an immersive user experience. As such, processing resources may be more focused on presentation of character biomechanics behaviors and deformation.

The animation rig may comprise primary joints and helper joints. At a particular time, the animation rig may be a pose, and the pose may be defined by spatial relationships between the primary joints and the helper joints (e.g., distances, angles relative to each other).

The primary joints may be associated with skeletal joints of a character (e.g., character 500). For example, the primary joint locations may include shoulders, elbows, wrists, knees, and ankles of the character 500. It is understood that the term "joint" is not meant to limiting; primary joints and helper joints may be located at non-skeletal joint locations (e.g., midpoint of a femur, top of the head).

Figure 6:
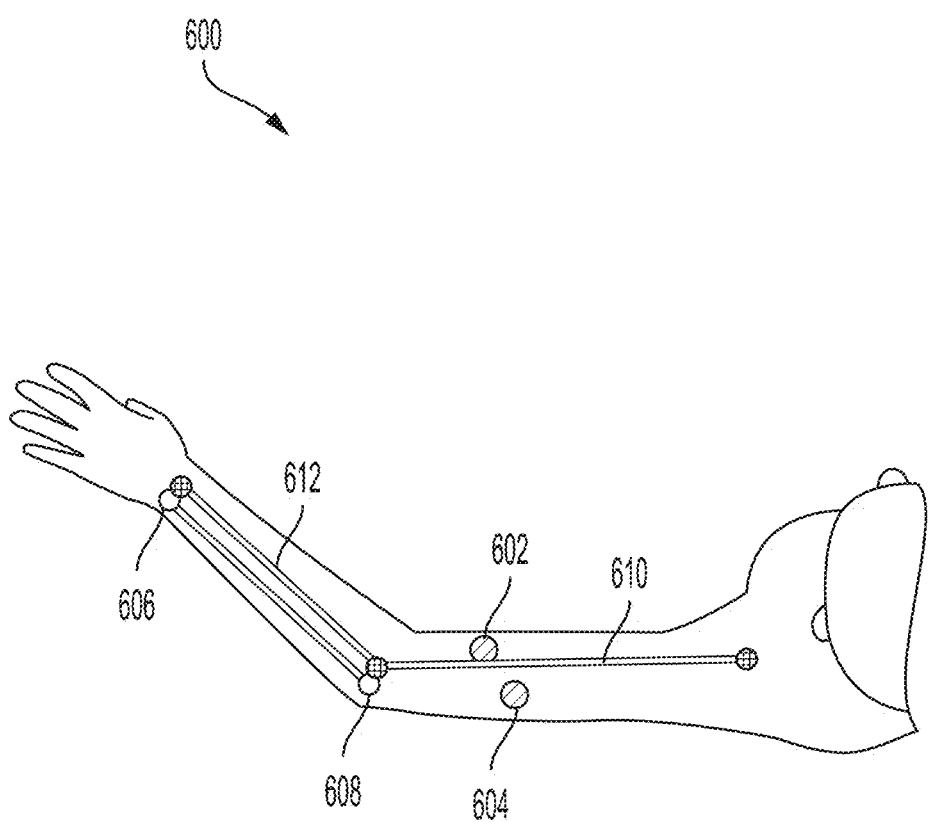
FIG. 6 illustrates an exemplary animation rig in a mixed reality system, according to embodiments of the disclosure.

FIG. 6 illustrates an exemplary animation rig 600 in a mixed reality system, according to embodiments of the disclosure. The animation rig 600 includes helper joints 602-608. The helper joints may be driven by a main skeleton (e.g., including primary joints 610 and 612) of the animation rig and create secondary deformations such as muscle bulging, skin sliding, soft tissue deformations, and rigid bone deformations. For example, helper joints 602 and 604 may be associated with bicep and tricep muscles of the character 500. When the elbow bends, the motion of the helper joints causes the muscles to appear to be bulging. Helper joints 606 and 608 may be associated with rigid motion of the ulna bone. As an exemplary advantage, using helper joints would reduce computation cost and power consumption, compared to using blendshapes, while presenting a life-like animation to the user of the mixed reality system.

The helper joints may be associated with locations of the animation rig determined by a helper joint placement criterion. In some embodiments, the helper joints is located at locations associated with large displacement between primary joints. For example, a helper joint may be located near the biceps of the character 500 between the wrist and the elbow (e.g., primary joints) because the biceps may experience a larger displacement for a particular movement associated with the shoulder and the elbow, compared to other locations of the character between the shoulder and the elbow. As another example, a helper joint may be located near the calves of the character 500 between the ankle and the knee (e.g., primary joints) because the calves may experience a larger displacement for a particular movement associated with the ankle and the knee, compared to other locations of the character between the ankle and the knee. In these examples, the locations of the helper joints at the biceps or the calves may be determined by a maximum movement criterion.

Although the movements and interactions of primary joints and helper joints are described with respect to the character's limbs, it is understand these exemplary movements and interactions are not limiting. For example, primary joints and helper joints may advantageously drive the virtual character's facial expressions.

In some examples, blendshapes may have too many moving points and inverted targets may not interpolate well. Using all blendshapes to animate the virtual character 500 may cause a large performance penalty at runtime. Helper joints may reduce this performance impact by converting shape information, normally handled by blendshapes, into skin clusters using a joint decomposition process. In some embodiments, the decomposition process calculates positions of the helper joints for each blendshape to match blendshape deformations. Additionally, skin weights of a skin cluster associate with each helper joint and each blendshape pose may be optimized to further improve the realism of the deformations. The skin clusters may be incorporated with a fewer number of blendshapes to remove undesirable high frequency features on the virtual character. Incorporating helper joints and skin clusters with fewer blendshapes may advantageously improve system performance and interpolation between poses due to smaller displacements, compared to using exclusively blendshapes, while maintaining a similar level of quality.

In some embodiments, the helper joint may be manually defined, for example, by designer of the character 500. For example, the designer may decide that manually defining a helper joint would allow the character 500 to become more "life-like."

The animation rig may be determined to move from a first pose at a first time to a second pose at a second time. For example, the mixed reality system may determine that the character 500 is moving from a first position to a second position in the mixed reality environment (e.g., MRE 150) to perform an action. At the first time, the animation rig may be in a first pose associated with the character in a first position (e.g., the character is not smiling, the character is sitting, the character is standing), and the first pose may be defined by first spatial relationships between the primary joints and helper joints of the character. At the second time, the character may move from the first position to a second position (e.g., the character is smiling, the character is standing, the character is walking); the animation rig may be in a second pose associated with the character in the second position, and the second pose may be defined by second spatial relationships between the primary joints and helper joints of the character. The first and second spatial relationships may be different because the first and second positions of the character are different. The display of the mixed reality system may be updated to present the character 500 in the second position based on the animation rig's second pose defined by the second spatial relationships between the character's primary joints and helper joints.

The transformation from the animation rig's first pose to the second pose may be defined by movement information. For example, the movement information may define movements of primary joints and helper joints and movements of character features between primary and helper joints from the first pose to the second pose. The movements of character features between primary and helper joints from the first pose to the second pose may be interpolated (e.g., determined using regression analysis), and the interpolation may be determined using the methods disclosed herein.

To create life-like biomechanics for the character, the spatial relationships between primary joints and helper joints may be complex and non-linear (e.g., the helper joints may be driven by constraints and expressions from the graphics application). The relationships may be defined with a radial basis function (RBF), which may require a large amount of samples. For example, in the deltoid-pectoral region, over 1100 poses may be required on each side to achieve a desirable quality using RBF. The large amount of samples may affect runtime performance of the mixed reality system, which may have power and computing resource restraints. Furthermore, using RBF to define relationships between the primary joints and helper joints may not satisfy a requirement (e.g., 6 ms per frame) of the mixed reality system. Therefore, it may be desirable to use a more efficient method (e.g., less computationally intensive) to present a virtual character in a high-quality manner.

In some embodiments, information associated with the animation rig's movement is transmitted to a neural network for processing. In some embodiments, information associated with the animation rig's movement is transmitted to more than one neural network for processing. The neural network receives the information associated with the animation rig's movement, computes the movement information, and transmits the movement information to the mixed reality system to present the movement of the virtual character on the display of the system based on the movement information.

In some embodiments, the movement information is further computed using training data presented to the neural network (e.g., by a rig designer, by a user). The training data may include animation data such as a range of motion test. The training data may cover poses and movements that a virtual character may perform in a mixed reality environment. For example, the training data includes examples of knee twists, and the neural network may compute movement information (e.g., rotational information associated with the knee joint) using these examples of knee twists. In some embodiments, the training data for a set of helper joints may primary comprises of a range-of-motion animation sequence and other example sequences. A number of hidden dimensions to use may be determined using hyper-parameter tuning. In some examples, the number of hidden dimensions may be ten times a maximum of a number of primary joints and a number of helper joints.

As an exemplary advantage, using the neural network to compute the movement information can reduce a number of parameters to achieve presentation of virtual character having a similar high quality, compared to using RBF parameters, because a neural network may include fewer trainable parameters (e.g., a factor of 28 times reduction). For example, for a similar quality presentation of the virtual character, 4.5 million parameters may be needed using RBF, but a significantly smaller 160 thousand parameters may be needed using a neural network.

In some embodiments, the neural network uses rectified linear unit (ReLU) activation functions to compute the movement information. Compared to other activation functions, ReLU functions can be more computationally efficient, and convey other advantages. In some embodiments, the neural network may be a multilayer feedforward neural network. The neural network may be a fully connected network with one hidden layer between an input layer and an output layer of the network. The neural network may translate and scale using mean square error (MSE) loss. In some embodiments, a total of 66 separate networks may be used compute the movement information of the animation rig. For each joint cluster, each of the networks may be separately trained for translation, rotation, and scaling. In some embodiments, translation values are scaled or normalized to a 0 to 1 range for the neural network.

In some embodiments, rotations associated with the animation rig may be represented with quaternions. Quaternions may be used for an animation system (e.g., Unreal) associated with presentation of the virtual character in a mixed reality environment on a display of a mixed reality system. Furthermore, quaternions may be more suitable for parameterizing rotations for machine learning. Existing methods for computing quaternions in neural networks measure loss with Euclidean angles, or retain orientation ambiguities. In some embodiments, quaternion training data may be cast to have a nonzero w component. Therefore, regressing quaternions may require a new loss function combining mean squared error loss of the component values with a penalty for component values greater than 1, which may be represented with the following function:

$$\mu MSE(max(Y_p-1,0)) \quad (1)$$

Because unit quaternions are used, no component should have a value higher than one. The training also clamps the magnitude of the gradients used for back-propagation (e.g., gradient clipping) to prevent the network from drifting to another pole. As an exemplary advantage, regressing quaternions using this described methodology allows the mixed reality system to run around 0.9 ms per frame. In some embodiments, this methodology may be integrated as a custom Blueprint operator in a game engine that executes as a TensorFlow Lite model running on a neural network or on the mixed reality system.

As an exemplary advantage, the character 500 may be configured to presented on a display of a mixed reality system (e.g., mixed reality system 112, mixed reality system 200, wearable system 400), which may have more hardware constraints compare to existing systems displaying high-end and real-time virtual characters due to the system's portability. In some examples, the mixed reality system may be battery-powered; thus, one of these hardware constraints may be power. Even with these hardware constraints, the methods described herein enable creation of a convincing virtual character; rendering, animation, deformations, clothing, hair, and behavior are able to meet a certain intangible quality level for the character to be believable while also fitting within the performance envelope of the hardware.

As mentioned, to improve a user's mixed reality experience, it is desirable for the virtual character to be as life-like as possible. In addition to realistic movements, the virtual character may be presented to display life-like behaviors. For example, gaze, gestures, and positioning of the virtual character should appear natural.

In some embodiments, the virtual character is able to hold the viewer in her gaze. For instance, in accordance with a determination that a line of sight associated with the wearable head device has changed, the virtual character may move from a first pose to a second pose. The movement from the first pose to the second pose may be the virtual character's gaze following the user's line of sight, based on the position of the wearable head device. Using the methods and features disclosed herein, processing and presenting the movement of the virtual character can be performed with low-latency, allowing the character to look at the user's eyes directly and accurately.

Figure 7A:
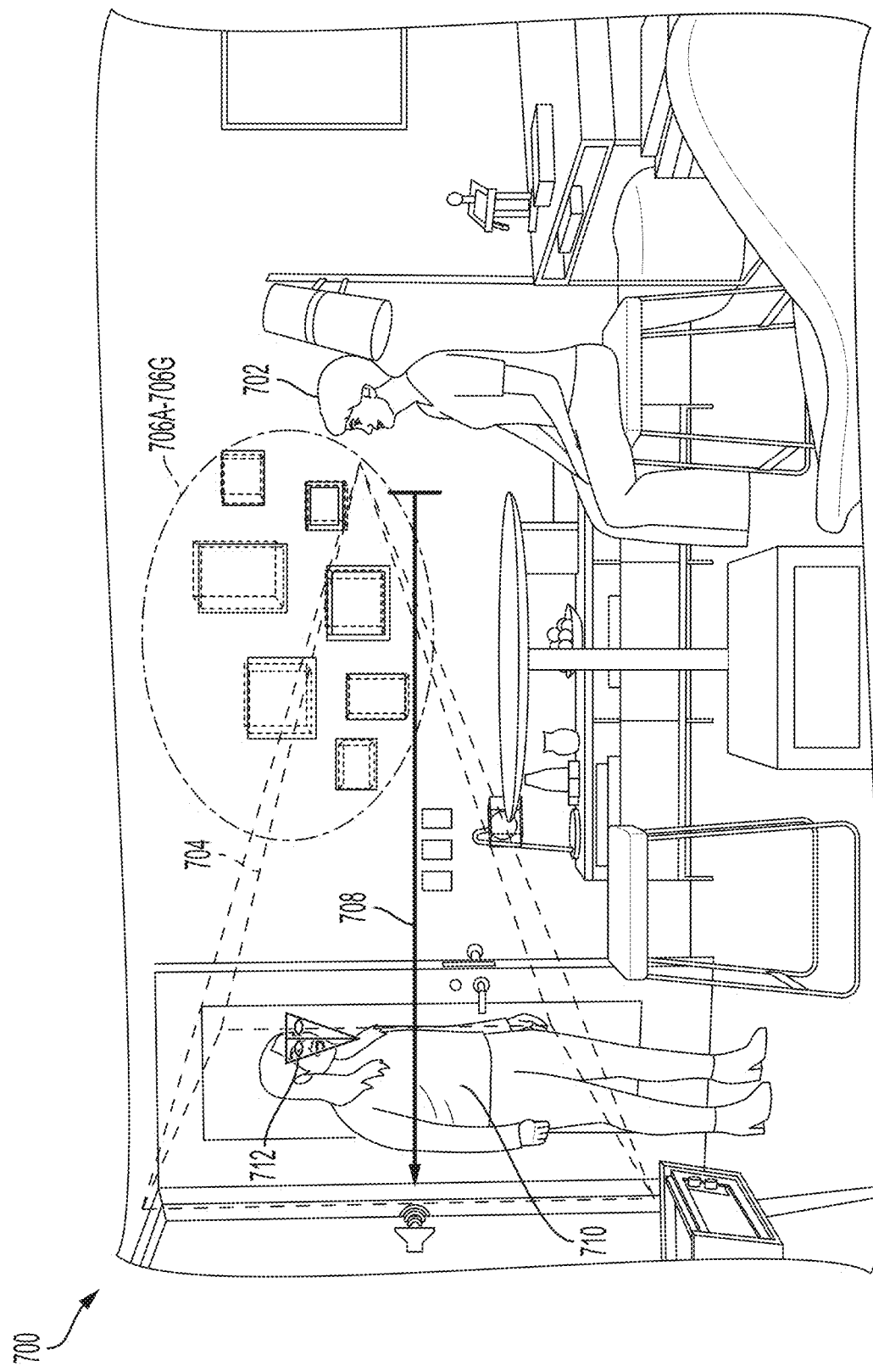
FIGS. 7A-7B illustrate aspects of an exemplary mixed reality environment, according to embodiments of the disclosure.

FIG. 7A illustrates an exemplary mixed reality environment 700, according to embodiments of the disclosure. In some embodiments, the virtual character 702's gaze and attention may be controlled by interesting impulses. The movement of the virtual character (e.g., rotating eyes, rotating neck, rotating body) in response to the character's changing gaze or attention may be presented using the methods presented herein. In some embodiments, the virtual character 702 is virtual character 132 or virtual character 500.

Interesting impulses may be generated by sources representing objects, sounds, and people. An interesting impulse has values associated with interestingness and decay or growth of this interestingness over time, which are dependent on the objects, sounds, and people. Interestingness of an element (e.g., a real or virtual object, sound, event, person) may be defined as a likeliness or probability that the element would draw the attention of the virtual character at a particular time. A first element having a higher interestingness value would more likely draw the virtual character's attention than a second element having a lower interestingness value. Interestingness value of an element may vary over time.

For example, an interestingness value associated with a painting on a wall may be higher than an interestingness value associated with a clock on the wall. Impulses can be generated for virtual objects or real objects detected by sensors of the mixed reality system (optionally with a perception system of the mixed reality system), defined manually, or defined by external information (e.g., from a database). Objects detected by the sensors may be compared with a database of objects and the detect objects may be matched with objects in the database for an associated interestingness value and varying interestingness values over time. In some embodiments, the interestingness values may be dependent on characteristics of the virtual character. For example, if the virtual character is a musician, interestingness values of musical objects associated with this virtual character may be higher than those associated with a non-artist virtual character. Based on the interestingness values of the different identified objects, the virtual character's eye direction, and the virtual character's head turning speed, the mixed reality system may make a decision on the most interesting object at a particular time (e.g., the object that is currently occupying the virtual character's attention). In some embodiments, if the most interesting object at a particular time is a virtual object, the virtual character may modify the mixed reality environment (e.g., by moving the virtual object) or modify the character's perception of the mixed reality environment (e.g., turning its head and seeing another interesting object) in response.

As an exemplary advantage, the interesting impulse may give the virtual character more life-like qualities by allowing the virtual character to shift its attention between objects and events happening in the mixed reality environment.

For example, virtual character 702 in the mixed reality environment 700 has an associated field of view 704 based on the direction of the virtual character's sight. The direction of the virtual character's sight may be driven by a base layer of animation, procedural curiosity, or other facts. In this example, interesting objects (e.g., inanimate object having an interestingness values) may be defined by gaze boxes 706A-706G. The gaze box may have a coordinate position and size and may be associated with objects in the field of view 704. For example, the virtual character 702 may look between different items on the wall, settling on one for a brief amount of time before looking to a next item, analogous to someone waiting in a room. Each gaze box may have an interestingness value and its value may vary (e.g., decay or grow) over time. For instance, the interestingness of an active gaze box (e.g., the gaze box the virtual character is currently focused on) may be decaying until a threshold value. When the threshold value of interestingness is reached, the virtual character may move its focus on another gaze box based on a combination of distance, intersection with the field or view, and stochastic selection, and so on.

The virtual character's gaze and attention may also be determined by interesting area 708 identified by the mixed reality system or manually. An interesting area 708 may be created in response to detection of a sound (e.g., by a sensor of the mixed reality system) associated with an event such as a door opening, sound of footsteps, or a loud and sudden sound. The detected sound may be associated with an event happening in a general direction of the sound source. For example, the door in the mixed reality environment is opened by the user 710 and generates a sound. In response to detection of the sound (e.g., by a sensor of the mixed reality system), the virtual character 702 may change its gaze or line of sight towards the general direction of the sound. In some embodiment, upon the detection of an interesting area, the virtual character may shift its focus from a gaze box that was previously occupying the virtual character's attention.

Figure 7B:
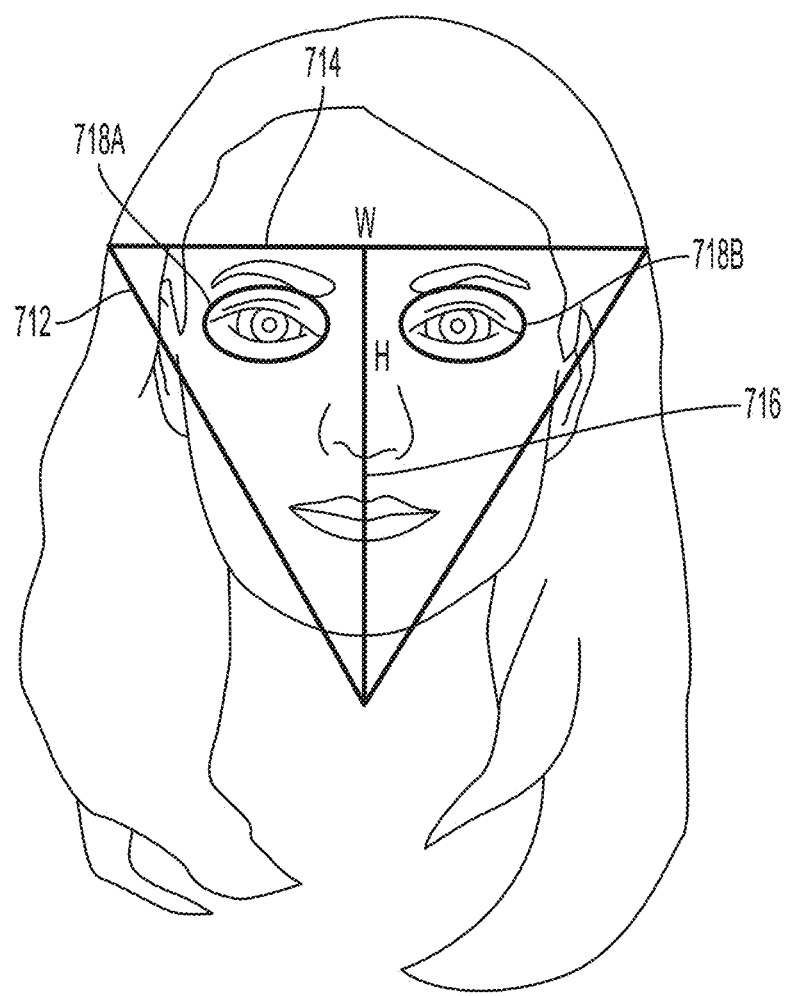

In some embodiments, the virtual character's gaze and attention is determined by a social triangle 712. FIG. 7B illustrates an example of a social triangle that may be associated with a user wearing a wearable head device. The social triangle 712 may be defined by a width 714 and a height 716. The social triangle 712 may be associated with an area of a human face (e.g., the user of the mixed reality system) that another human typically focus on during a conversation between the two human. For example, the width 714 is associated with a width of user 710's face, and the height 716 is associated with a height of the user 710's face. In some embodiment, more area of the social triangle may be near the eyes than the mouth. This area of human face may be detected by sensors of the mixed reality system. Once a social triangle is generated based on detection of a human face (e.g., the user of the mixed reality system), the gaze and attention of the virtual character may be directed to the detected human face. In some embodiments, upon the generation of the social triangle, the virtual character may shift its focus from an interesting area or a gaze box that was previously occupying the virtual character's attention.

Saccades are be rapid involuntary eye darts that human may make when looking at objects or other people. Saccade points, which may not be presented to the user of the mixed reality system, may be generated for the virtual character 702 to bound the virtual character's current saccade movements. Generating saccades for the virtual character increases the believability of the virtual character's human-like features. Saccade points may be generated based on an area of the current most interesting object (e.g., an object that is currently occupying the virtual character's attention), such as a social triangle, an interesting area, or a gaze box, projected onto the eyes of the virtual character. For example, the range of the virtual character's saccade movements may be determined by the boundaries 718A and 718B of the eyes of the social triangle projected onto the virtual character's eyes because the virtual character 702 may be focused around the eye areas of a viewer. Saccade timing and amplitude associated with the virtual character may additionally correspond to values in nominal physiological ranges.

Although the gaze box 706, interesting area 708, and social triangle 712 are exemplify using specific geometries illustrated in FIGS. 7A-7B, it is understood that the geometrical boundaries illustrated in FIGS. 7A-7B are not meant to be limiting.

In some embodiments, the virtual character's gaze is controlled by a target in the mixed reality environment. The target, which may not be presented to the user in the mixed reality environment, may be moving relative to the position of the virtual character and the gaze of the virtual character tracks the movement of the target to generate life-like eye movements (e.g., small changes in gaze direction). In some embodiments, gaze movement is additionally controlled by ratio of rotations between the eyes, the neck, and the body to allow the eyes to move about a natural equilibrium. For example, gaze movements are adjusted for posture discomfort over time; in some instances, the target may not be moving while this adjustment is taking place. In some examples, the virtual character's gaze movements may be based on the virtual character's current mood or mode. For example, if the virtual character is focused on a task, its gaze movements may not be as great as a virtual character that is bored.

The virtual character's gaze and body disposition may be dynamically determined by a discomfort system, which allows the character to avoid holding poses for unnaturally long periods of time. In some embodiments, when an animation rig associated with the character is in a first pose longer a character discomfort threshold time, the animation rig would move from the first pose to a second pose (e.g., a more comfortable position), as described herein. As an exemplary advantage, moving to a second pose after being in a first pose beyond a character discomfort threshold time may give the virtual character more life-like qualities by allowing the virtual character to shift its position like a human shifting to a more comfortable position after being in a position for an uncomfortable amount of time.

The mixed reality system may continuously scan the mixed reality environment for geometry, so the virtual character appears to stand on where the surface (e.g., floor) actually is. In some embodiments, the animation rig associated with the virtual character is displayed to be positioned on a surface (e.g., a floor) of the mixed reality environment. Sensors of the mixed reality system may sense for coordinates of the surface of the mixed reality environment, and the animation rig may be aligned to the surface of the mixed reality environment based on the sensed coordinates of the surface. In some embodiments, the animation rig is in a first pose, and the first pose is based on the alignment of the animation rig and the surface. As an exemplary advantage, aligning the character and the surface of the mixed reality environment gives the user more of a sense that the virtual character and the user exist in a same environment.

Figure 8:
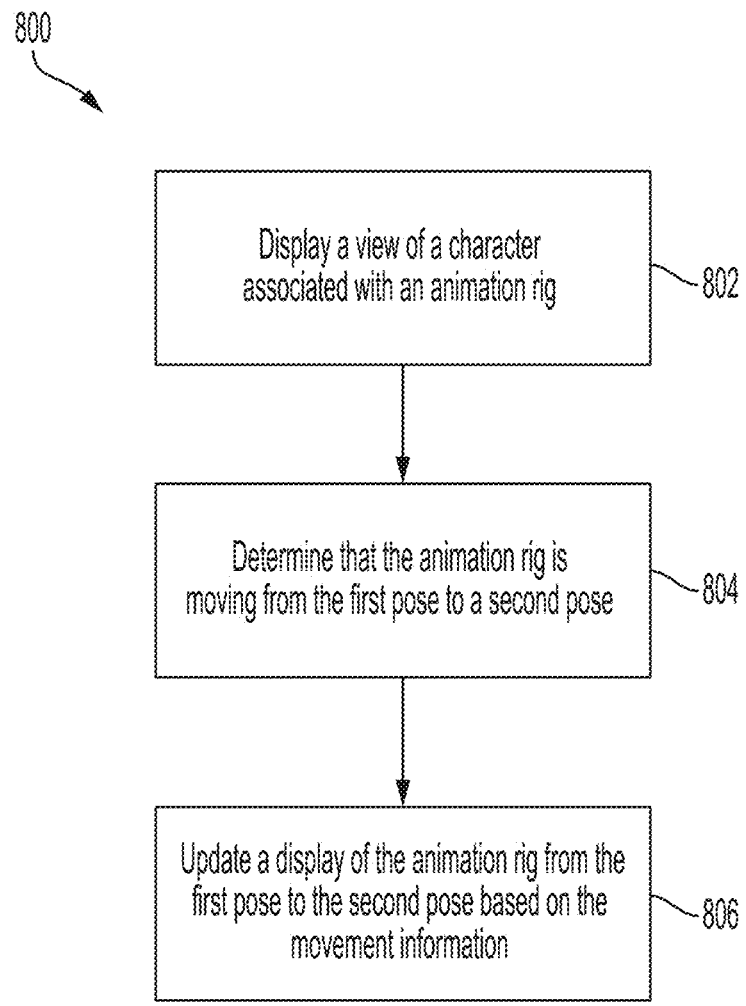
FIG. 8 illustrates an exemplary method of a mixed reality system, according to embodiments of the disclosure.

FIG. 8 illustrates an exemplary method 800 of a mixed reality system, according to embodiments of the disclosure. The method 800 may be performed using a mixed reality system, such as mixed reality system 112, mixed reality system 200, or wearable system 400. It is understood that the steps may be in different orders, some steps may be omitted, or additional steps may be performed with method 800.

In some embodiments, the method 800 includes displaying (step 802), on a display of a wearable head device (e.g., mixed reality system 112, mixed reality system 200, wearable system 400), a view of a character in a mixed reality environment. The view of the character may be based on an animation rig associated with the character. In some embodiments, displaying the view of the character in the mixed reality environment comprises rendering the view of the character using Forward+.

In some embodiments, the animation rig comprises primary joints and helper joints, as described herein. The primary joints may be associated with skeletal joints of a character (e.g., virtual character 132, virtual character 500, virtual character 702) associated the animation rig. The helper joints may be associated with locations of the animation rig. The locations may be determined by a helper joint placement criterion (e.g., manual definition, maximum movement criterion), as described herein. At a first time, the animation rig may be in a first pose defined by with a first spatial relationships between configuration of the primary joints and the helper joints.

In some embodiments, the method 800 includes determining (step 804), at a second time, that the animation rig is moving from the first pose to a second pose, wherein the second pose is associated defined by second spatial relationships between the primary joints and the helper joints.

In some embodiments, determining that the animation rig is moving from the first pose to the second pose comprises determining a line of sight associated with the wearable head device has changed. For example, the gaze of the virtual character toward a viewer has changed, as described herein.

In some embodiments, determining that the animation rig is moving from the first pose to the second pose comprises determining that an interestingness value associated with a first element of the mixed reality environment exceeds an interestingness value associated with a second element of the mixed reality environment, as described with respect to FIG. 7. In some embodiments, the interestingness value is associated with one of a gaze box associated with an inanimate object of the mixed reality environment, an interesting area associated with an event of the mixed reality environment, and a social triangle associated with a user in the mixed reality environment, such as described with respect to FIGS. 7A-7B.

In some embodiments, the character is displayed to be positioned on the surface of the mixed reality environment. The method 800 may further comprise sensing, with a sensor of the wearable head device, the surface of the mixed reality environment and aligning the animation rig and the surface based on the sensed surface, wherein the first pose is determined based on the alignment of the animation rig and the surface.

In some embodiments, the method 800 includes updating (step 806) a display, on the display of the wearable head device, of the animation rig from the first pose to the second pose based on movement information, wherein the movement information indicates a transformation from the first spatial relationships to the second spatial relationships. In some embodiments, the transformation from the first spatial relationships to the second spatial relationships is associated with the character's muscle movements when the animation rig moves from the first pose to the second pose.

In some embodiments, the movement information is represented at least in part in quaternions, and a loss function associated with the movement information comprises combining mean squared error loss of quaternion component values and a penalty for the component values (e.g., equation (1)).

In some embodiments, the method 800 includes transmitting, to a neural network, as described herein, information associated with a movement of the animation rig; and receiving, from the neural network, the movement information, wherein the movement information is based on the transmitted information. The neural network may use an ReLU activation function to compute the movement information. In some embodiments, the movement information is computed based on training data, as described herein, presented to the neural network.

Figure 9:
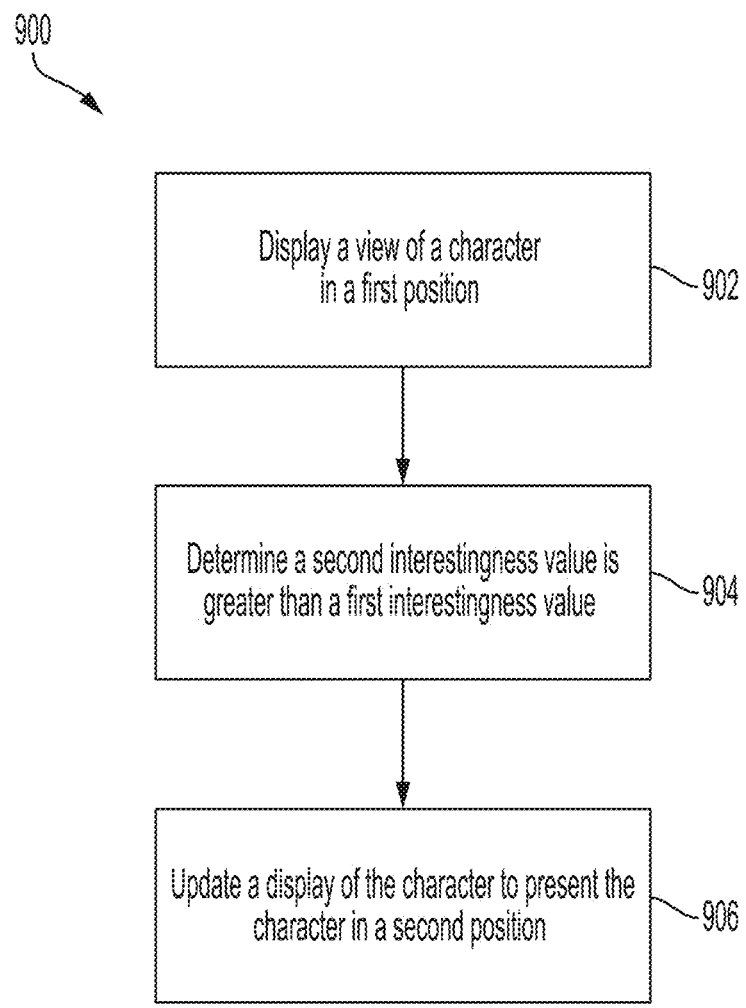
FIG. 9 illustrates an exemplary method of a mixed reality system, according to embodiments of the disclosure.

FIG. 9 illustrates an exemplary method 900 of a mixed reality system, according to embodiments of the disclosure. The method 900 may be performed using a mixed reality system, such as mixed reality system 112, mixed reality system 200, or wearable system 400. It is understood that the steps may be in different orders, some steps may be omitted, or additional steps may be performed with method 900. For the sake of brevity, examples related to method 900 described with respect to FIGS. 7A and 7B are not repeated here.

In some embodiments, the method 900 includes displaying (step 902) a view of a character in a mixed reality environment. The character may be in a first position. For example, the character may have its sight (e.g., looking at, focusing on, paying attention to) on a first element (e.g., an object, a sound, an event, a person) in the mixed reality environment, as described with respect to FIGS. 7A-7B. The first element may have a first interestingness value at a first time. An object having an interestingness value may be indicated by a gaze box, a sound or an event having an interestingness value may be indicated by an interesting area, and a person having an interestingness value may be indicated by a social triangle.

In some embodiments, the method 900 includes determining (step 904), at a second time, a second interestingness value associated with a second element (e.g., another object, another sound, another event, another person) associated with a mixed reality environment is greater than the first interestingness value. For example, the first interestingness value decayed over time and the character may be losing interest of the first element. As another example, the character may find another element in the mixed reality environment more interesting at a second time.

In some embodiments, the method 900 includes updating (step 906) a display of the character to present the character in a second position. For example, the character may have its sight (e.g., looking at, focusing on, paying attention to) on the second element (e.g., the other object, the other sound, the other event, the other person) in the mixed reality environment, as described with respect to FIGS. 7A-7B, in accordance with the determination that the second element has a greater interestingness value than the first interestingness value at a second time.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A method comprising:
    displaying, on a display of a wearable head device, a view of a character in a mixed reality environment, wherein:
        the view of the character is based on an animation rig associated with the character;
        the animation rig comprises a primary joint and a helper joint,
        the primary joint is associated with skeletal joints of the character, and
        said displaying comprises displaying the animation rig in a first pose comprising a first spatial relationship between the primary joint and the helper joint;
    determining that the animation rig is transitioning from the first pose to a second pose, wherein the second pose comprises a second spatial relationship between the primary joint and the helper joint; and
    updating a display, on the display of the wearable head device, of the animation rig from the first pose to the second pose based on movement information, wherein:
        the movement information indicates a transformation from the first spatial relationship to the second spatial relationship, and
        the movement information comprises a quaternion component value and an output of a loss function, the loss function comprising a combination of a mean squared error loss of the quaternion component value and further comprising a penalty for the component value.

2. The method of claim 1, wherein the character is positioned on a surface of the mixed reality environment, the method further comprising:
    detecting, with a sensor of the wearable head device, the surface of the mixed reality environment; and
    determining an alignment of the animation rig and the surface based on the detected surface, wherein one or more of the first pose and the second pose are determined based on the alignment of the animation rig and the surface.

3. The method of claim 1, further comprising:
    determining that the animation rig is transitioning from the second pose to a third pose, wherein the third pose comprises a third spatial relationship between a second primary joint and a second helper joint; and
    updating a display, on the display of the wearable head device, of the animation rig from the second pose to the third pose based on second movement information, wherein:
        the second movement information indicates a transformation from the second spatial relationships to the third spatial relationships, and
        the second movement information comprises a second quaternion component value and an output of a second loss function, the second loss function comprising combination of a second mean squared error loss of the second quaternion component value and further comprising a second penalty for the second component value.

4. The method of claim 3, wherein the first loss function comprises the second loss function.

5. The method of claim 1, further comprising:
    displaying, on the display of the wearable head device, a view of a second character in the mixed reality environment, wherein:
        the view of the second character is based on a second animation rig associated with the second character;
        the second animation rig comprises a second primary joint and a second helper joint,
        the second primary joint is associated with skeletal joints of the second character, and
        said displaying of the view of the second character comprises displaying the second animation rig in a third pose comprising a third spatial relationship between the second primary joint and the second helper joint;
    determining that the second animation rig is transitioning from the third pose to a fourth pose, wherein the fourth pose comprises a fourth spatial relationship between the second primary joint and the second helper joint; and
    updating a display, on the display of the wearable head device, of the second animation rig from the third pose to the fourth pose based on second movement information, wherein the second movement information indicates a transformation from the third spatial relationship to the fourth spatial relationship.

6. The method of claim 1, wherein:
    the first pose corresponds to a first gaze position, and
    the second pose corresponds to a second gaze position.

7. The method of claim 1, wherein:
    the first pose corresponds to a first gesture, and
    the second pose corresponds to a second gesture.

8. The method of claim 1, wherein:
    the first pose corresponds to a first eye position, and
    the second pose corresponds to a second eye position.

9. The method of claim 1, wherein said determining that the animation rig is moving from the first pose to the second pose comprises determining the animation rig is in the first pose longer than a threshold time.

10. The method of claim 9, wherein the threshold time is determined based on an application associated with the character.

11. The method of claim 9, wherein the threshold time is determined based on a state of the character at a time between the first time and the second time.

12. The method of claim 9, wherein the threshold time is determined based on a property of an element in the character's line of sight.

13. The method of claim 9, wherein the threshold time is determined based on a state of a user of the wearable head device.

14. The method of claim 1, further comprising presenting animation rig data as input to a neural network, wherein the movement information is determined based on an output of the neural network.

15. The method of claim 1, wherein the movement information is determined further based on training data presented to a neural network.

16. The method of claim 1, further comprising presenting a result of the loss function as input to a neural network, wherein the movement information is determined based on an output of the neural network.

17. The method of claim 1, wherein the movement information comprises parameterized rotations.

18. A system comprising:
a wearable head device comprising a display; and
one or more processors configured to execute a method comprising:
displaying, on the display of a wearable head device, a view of a character in a mixed reality environment, wherein:
the view of the character is based on an animation rig associated with the character;
the animation rig comprises a primary joint and a helper joint,
the primary joint is associated with skeletal joints of the character, and
said displaying comprises displaying the animation rig in a first pose comprising a first spatial relationship between the primary joint and the helper joint;
determining that the animation rig is transitioning from the first pose to a second pose, wherein the second pose comprises a second spatial relationship between the primary joint and the helper joint; and
updating a display, on the display of the wearable head device, of the animation rig from the first pose to the second pose based on movement information, wherein:
the movement information indicates a transformation from the first spatial relationship to the second spatial relationship, and
the movement information comprises a quaternion component value and an output of a loss function, the loss function comprising a combination of a mean squared error loss of the quaternion component value and further comprising a penalty for the component value.

19. The system of claim 18, wherein the method further comprises presenting animation rig data as input to a neural network, wherein the movement information is determined based on an output of the neural network.

20. A non-transitory computer-readable medium storing instructions that, when executed by one or more processors, cause the one or more processors to execute a method comprising:
displaying, on a display of a wearable head device, a view of a character in a mixed reality environment, wherein:
the view of the character is based on an animation rig associated with the character;
the animation rig comprises a primary joint and a helper joint,
the primary joint is associated with skeletal joints of the character, and
said displaying comprises displaying the animation rig in a first pose comprising a first spatial relationship between the primary joint and the helper joint;
determining that the animation rig is transitioning from the first pose to a second pose, wherein the second pose comprises a second spatial relationship between the primary joint and the helper joint; and
updating a display, on the display of the wearable head device, of the animation rig from the first pose to the second pose based on movement information, wherein:
the movement information indicates a transformation from the first spatial relationship to the second spatial relationship, and
the movement information comprises a quaternion component value and an output of a loss function, the loss function comprising a combination of a mean squared error loss of the quaternion component value and further comprising a penalty for the component value.

* * * * *